(12) United States Patent
Yatabe (10) Patent No.: US 6,454,093 B1
(45) Date of Patent: Sep. 24, 2002

(54) CASSETTE STORAGE CASE (75) Inventor: Kazumoto Yatabe, Miyagi (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/639,170

(22) Filed: Aug. 16, 2000

(30) Foreign Application Priority Data

| Aug. 17, 1999 | (JP) | 11-230723 |
| Oct. 5, 1999 | (JP) | 11-284450 |
| Oct. 5, 1999 | (JP) | 11-284453 |
| May 25, 2000 | (JP) | 2000-155006 |

(51) Int. Cl.7 .......................................... B65A 85/672
(52) U.S. Cl. ................ 206/387.1; 206/387.12
(58) Field of Search .................. 206/387.1, 387.12, 206/387.13, 472, 493

(56) References Cited

U.S. PATENT DOCUMENTS

| 4,365,713 A | * 12/1982 | Ekuan | 206/387.1 |
| 5,038,932 A | 8/1991 | Sheu | |
| 5,085,322 A | 2/1992 | Lax | |
| 5,160,028 A | * 11/1992 | Morita | 206/387.1 |
| 5,165,541 A | * 11/1992 | Morita | 206/387.1 |
| 5,373,941 A | * 12/1994 | Morita | 206/387.1 |
| 5,560,481 A | * 10/1996 | Doodson et al. | 206/387.1 |
| 5,913,423 A | * 6/1999 | Sasaki | 206/387.12 |
| 6,241,093 B1 | * 6/2001 | Yatabe | 206/387.1 |
| 6,260,702 B1 | * 7/2001 | Yatabe | 206/387.1 |
| 6,286,676 B1 | * 9/2001 | Yatabe | 206/387.12 |

FOREIGN PATENT DOCUMENTS

| EP | 0411237 A2 | 2/1991 |
| EP | 0592887 A2 | 4/1994 |
| EP | 0854097 A1 | 7/1998 |
| EP | 0872841 A1 | 10/1998 |
| EP | 0971356 A1 | 1/2000 |

* cited by examiner

Primary Examiner—Bryon P. Gehman
(74) Attorney, Agent, or Firm—Rader, Fishman & Grauer PLLC; Ronald P. Kananen, Esq.

(57) ABSTRACT

A slide-type cassette storage case is disclosed that can accommodate a tape cassette when inserted laterally through an insertion port provided on a side surface of the cassette storage case. In one embodiment of the cassette storage case (31), a protrusion (10) of the cassette tape is accommodated by a notch (45) formed in a deep wall portion (32d) of the cassette storage case. In another embodiment of the cassette storage case (31), thick portions (33e) include thickness-missing portions (46) in a center portion of the upper half (33), and also includes thick portions (32e) include cassette holding portions (47) on the lower half (32). The notch (45) reduces the size and the production cost of the cassette storage case (31). The missing-thickness portions (46) eliminate warp or surface sink during the manufacturing process. The notch (45) and the cassette holding portions (47) of the cassette storage case (31) minimize the clearance between the cassette and the cassette storage case (31) to positively hold the cassette in a lightly locked state in the cassette storage case (31).

2 Claims, 9 Drawing Sheets

CASSETTE STORAGE CASE

BACKGROUND OF THE INVENTION

1. Field of the Invention

The present invention relates to a cassette storage case preferable for storage of a tape cassette, such as audio compact cassette, and more particularly to a slide-type cassette storage case in which a cassette to be stored is inserted laterally from an insertion port provided on a side of the cassette storage case and stored therein.

2. Description of the Related Art

A compact cassette for use in audio equipment or the like is stored in a cassette storage case made of plastic or the like when it is not used.

Although various types of the conventional cassette storage cases have been developed, the inventor of the present invention has proposed a new cassette storage case as disclosed in Japanese Patent Application No. HEI10-139087.

This cassette storage case is a slide-type cassette storage case in which a cassette is inserted laterally through an insertion port provided on one side thereof and stored therein.

This conventional slide-type cassette storage case will be described with reference to FIGS. 9–11.

Figure 9:
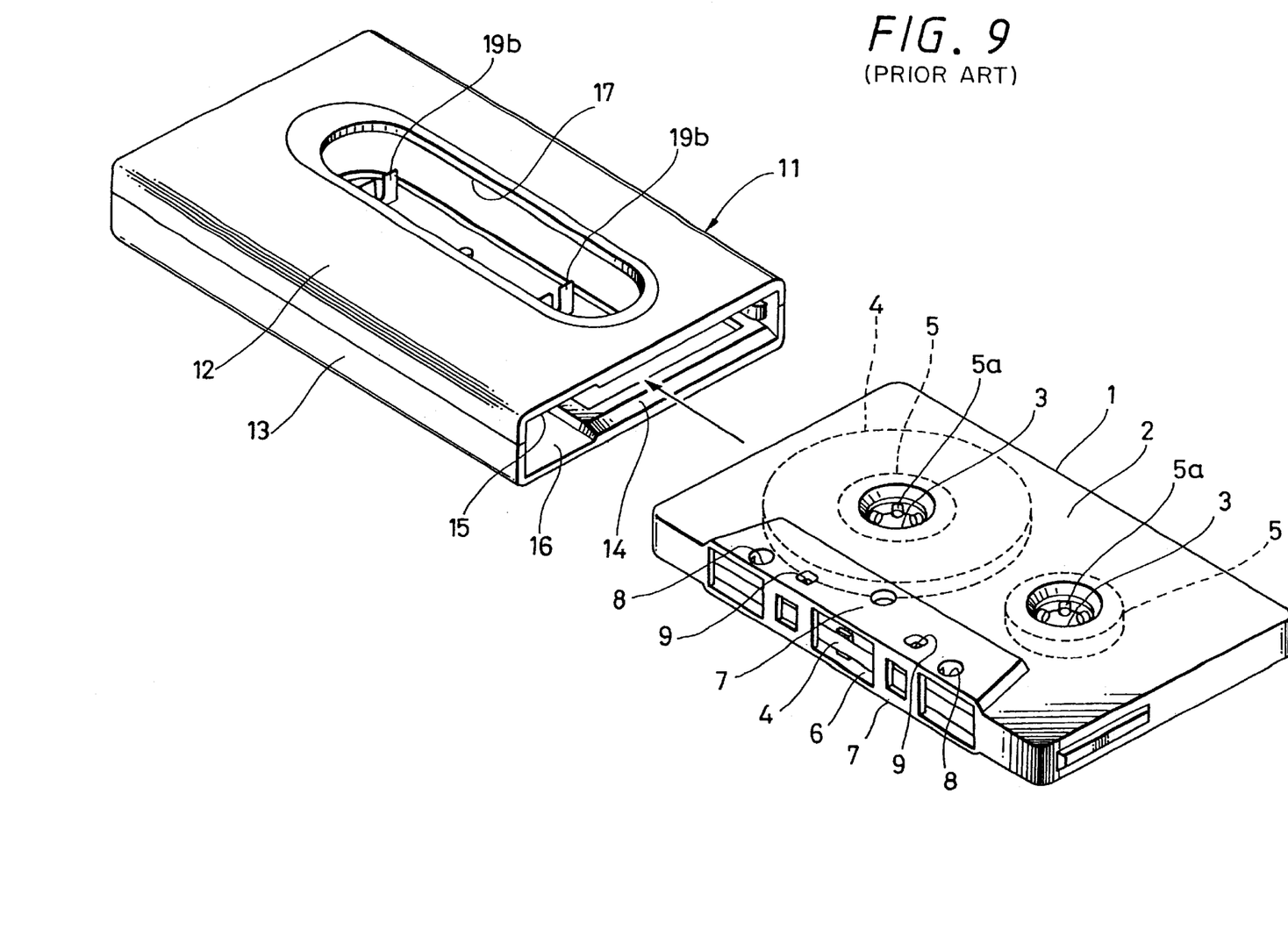
FIG. 9 is a perspective view showing a conventional cassette storage case and a cassette.
Figure 10:
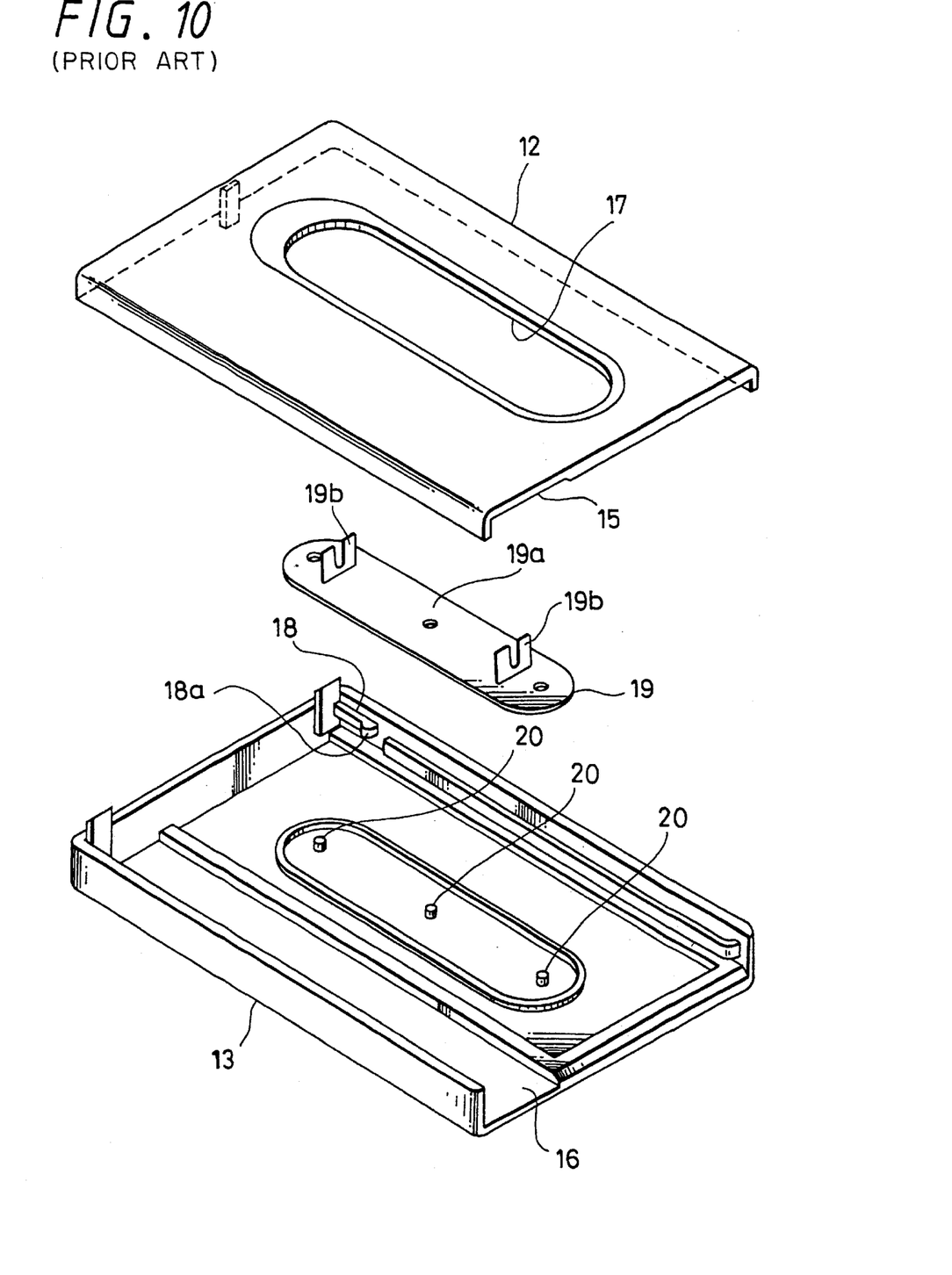
FIG. 10 is an exploded perspective view of the conventional cassette storage case of FIG. 9.
Figure 11:
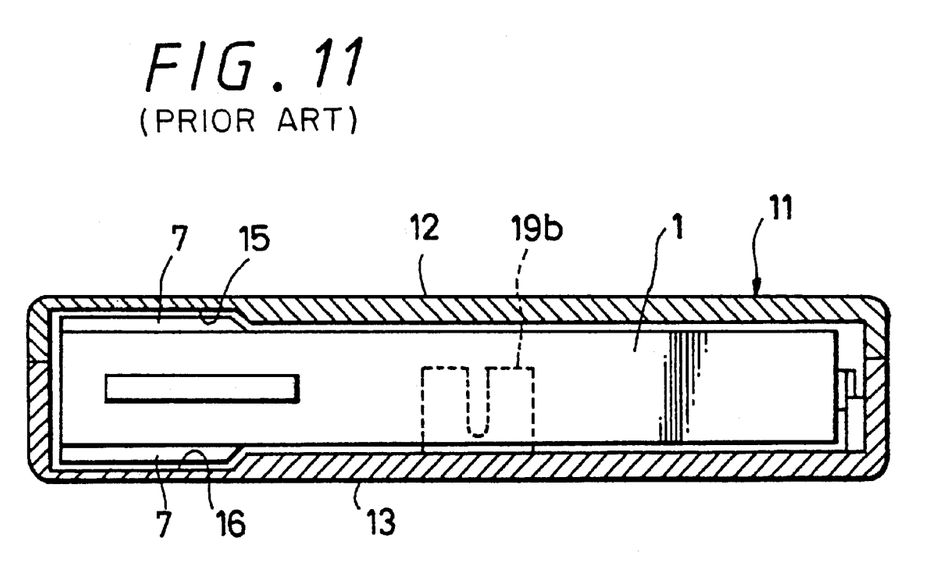
FIG. 11 is a cross-sectional side view of the cassette being stored in the conventional cassette storage case of FIG. 9.

In FIGS. 9–11, reference numeral 11 shows a cassette storage case and an audio compact cassette 1 (hereinafter, referred to simply as a cassette) is inserted laterally into the cassette storage case 11 through an insertion port 14 provided on one side thereof and stored therein.

First, a structure of the cassette 1 is described briefly. a case 2 of the cassette 1 has a thin casing structure in which a reel driving shaft insertion hole 3 is formed on each of the right and left sides. A pair of tape reels 5 corresponding to the reel driving shaft insertion holes 3 for winding a magnetic tape 4 are rotatably accommodated within the cassette case 2.

An opening portion 6 through which the magnetic tape 4 is exposed is formed in a front portion of the cassette case 2. Within the cassette case 2, a tape travelling path is formed such that the magnetic tape 4 from one side of the tape reel 5 (supply side reel) is wound up by the other side of the tape reel 5 (windup side reel) as the magnetic tape 4 passes through the opening portion 6.

A magnetic head and the like are inserted into the opening portion 6 from a cassette deck side. To cope with the thickness of the insertion portion of the magnetic head and the like, trapezoidal expanded portions 7, which are expanded from both upper and lower surface sides, are formed at the front portion of the cassette case 2.

Further, capstan shaft insertion holes 8 and positioning reference holes 9 are formed symmetrically on the right and left sides of the expanded portions 7.

The cassette storage case 11 into which the cassette 1 is to be inserted is comprised of a upper half 12 and a lower half 13 that are joined together. The upper half 12 is plastic molding product molded from, for example, GPPS (general purpose polystyrene) material, and the lower half 13 is plastic molding product molded from, for example, HIPS (impact-resistant polystyrene) material. The upper half 12 and the lower half 13 are joined together by means of ultrasonic waves and the like.

Then, the insertion port 14 is provided on one side surface of the cassette storage case 11. The cassette 1 is inserted laterally (in the longitudinal direction of the cassette case 2) through the insertion port 14 and stored therein.

The cassette storage case 11 is so constructed as to accommodate the cassette 1 almost without any clearance. Thus, the inside the cassette storage case 11 includes concave grooves 15, 16 for accommodating the expanded portions 7 of the cassette 1 are formed on inner surface sides of the upper half 12 and lower half 13 in the lateral direction (cassette insertion direction).

Further, an opening portion 17 of an oblong-shape in the cassette insertion direction is formed in a central portion of the upper half 12 of the cassette storage case 11. When the cassette 1 is to be taken out from the cassette storage case 11, a finger (for example, thumb) is inserted through the opening portion 17 to push the cassette 1 out of the insertion port 14.

Inside the cassette storage case 11, a stopper piece 18 is provided to prevent the cassette 1 from unexpectedly jumping out of such a cassette storage state. The stopper piece 18 is formed integrally with the lower half 13 and includes an engaging protrusion 18a provided at a tip portion thereof. When the cassette 1 is stored in the cassette storage case 11, the engaging protrusion 18a of the stopper piece 18 engages with an error erase preventing detection hole (not shown) provided in the back of the cassette case 2. As a result, the cassette 1 is held in a lightly locked state in the cassette storage case 11, thereby preventing the cassette 1 from unexpectedly jumping out (slipping out) of the cassette storage case 1.

Further, a reel stopper member 19 is provided inside the cassette storage case 11 to prevent an unnecessary rotation of the tape reels 5 in the cassette 1, thereby preventing the magnetic tape 4 from becoming loose.

The reel stopper member 19 is a molded plastic product molded from, for example, polypropylene (PP) material, in which reel stopper portions 19b corresponding to reel driving shaft insertion holes 3 of the cassette 1 are formed on a base plate portion 19a thereof. Then, the base plate portion 19a is crimped to form crimping protrusions 20 provided substantially in a center portion of the inner surface of the lower half 13.

Then, when the cassette 1 is inserted into the cassette storage case 11, the reel stopper portions 19b are subjected to elastic deformation so that they are pushed down by the cassette 1. When the cassette 1 is completely accommodated in the cassette storage case 11, the reel stopper portions 19b are elastically return to an erect state because the reel driving shaft insertion holes 3 of the cassette 1 correspond to the reel stopper pieces 19b. As a result, the reel stopper portions 19b engage with the engaging protrusions 5a on an inner circumference of the tape reel 5, thereby blocking the rotation of the tape reel 5.

As described above, the conventional cassette storage case 11 is comprised of three parts including the upper half 12, the lower half 13 and the reel stopper member 19. As for the assembly procedure, first, the reel stopper member 19 is crimped to the lower half 13 and after that, the upper half 12 and the lower half 13 are fused together by ultrasonic waves.

SUMMARY OF THE INVENTION

Because the conventional cassette storage case 11 requires a complicated assembly process, production efficiency is low, which results in higher production cost.

When fusing the upper half 12 and the lower half 13 together with ultrasonic waves, a warp occurs due to uneven thickness of the upper half or lower half, so that the fusion between the upper half and lower half is not uniform. Consequently, there occurs a difference of step in the fused state or protrusion of the fusion, thereby a number of defective products being produced and production efficiency largely dropping.

Figure 7:
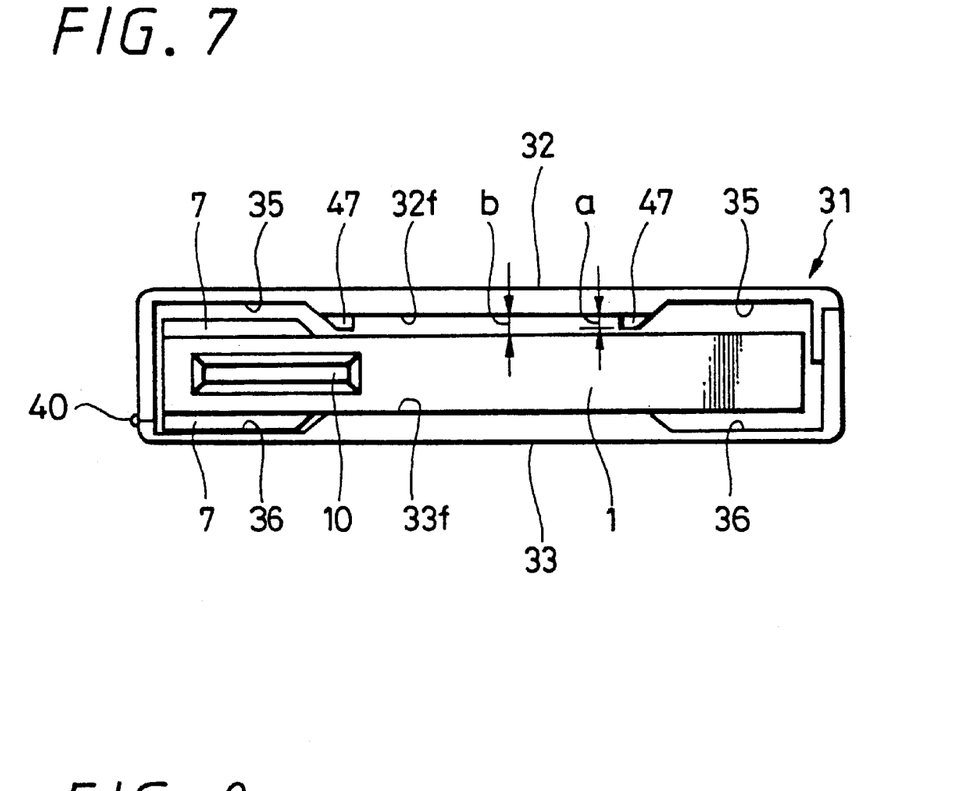
FIG. 7 is a side view of cassette being stored in the cassette storage case of FIG. 6.
Figure 8:
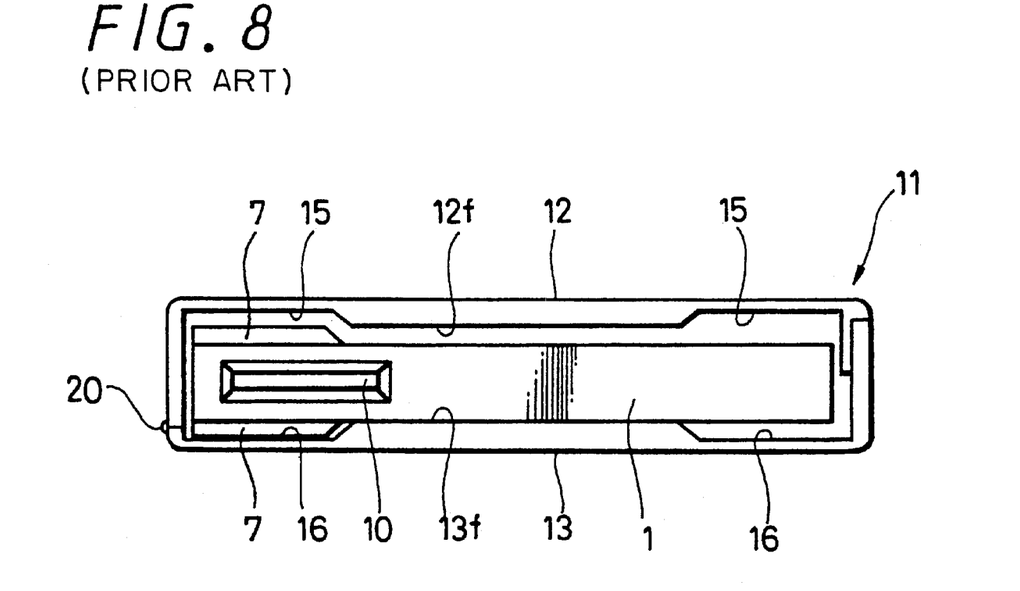
FIG. 8 is a side view of a cassette stored in a conventional cassette storage case.

Because the slide-type cassette storage case 11 has such a structure, when the cassette 1 is stored, a protrusion 10 on a side surface portion 2a of the cassette 1 comes into contact with a deep wall portion 12d of the upper half 12, as shown in FIG. 7. When stored, there is a large gap between the side surface portion 2a of the cassette 1 and the deep wall portion 12d. As a result, the cassette 1 is loose in the case so that a stabilized storage state cannot be achieved.

Further, the cassette storage case 11 has to be formed in a size large enough for completely accommodating the cassette 1. In the above described structure in which the protrusion 10 of the cassette 1 comes into contact with the deep wall portion 12d, the length in the cassette insertion direction needs to be increased by a length of the protrusion 10. Thus, the size of the cassette storage case increases and more molding material is used, thereby leading to an increase of production cost. The problem becomes large in the case where the deep wall portion is to be formed by superposing the upper half on the lower half, as shown in FIG. 7.

Further, the cassette storage case 11 is formed of resin material, such as polypropylene as described above. However, one problem that is characteristic of resin is warp or surface sink (deformation in a concave state) that is generated due to contraction after molding (particularly polypropylene is contracted largely after molding because of crystalline resin so that an excessive warp or surface sink may be generated).

Such a warp or surface sink is likely to be generated in a portion having a large difference of thickness in the completed product. That is, because in the conventional cassette storage case described above, there is a large difference in the thickness between the concave groove that retreats from the expanded portion of the cassette and the thick portion along the concave groove. The warp or surface sink is often generated at this portion after molding, so that the quality of a completed case is largely impaired.

The present invention is implemented with an object to solve these problems in the slide-type cassette storage case in which a cassette is laterally inserted from an inserting port provided on one side surface thereof and stored therein. Specifically, the objects for a new cassette storage case are as follows:

1) To provide a structure whereby the case can be downsized.

2) To eliminate the generation of warp and surface sink due to molding to improve dimensional precision.

3) To eliminate the looseness of the stored cassette.

4) To provide a cassette storage case capable of being surely and easily assembled as well as to improve production efficiency.

To achieve these and other objects, the present invention provides:

1) A cassette storage case that includes a notch formed in the deep wall portion that accommodates the protrusion provided on the side surface portion of the cassette. Because the protrusion of the cassette is accommodated in the notch in the deep wall portion when the cassette is stored, the cassette is stored in a stabilized state without any looseness.

In addition, the size of the cassette storage case can be reduced because the length of the cassette storage case in the cassette insertion direction can be reduced by a length corresponding to the protrusion, as compared to the conventional storage cases.

2) A cassette storage case having concave grooves including thickness-missing portions provided substantially in the center of the thick portion along the concave grooves.

In the cassette storage case of the present invention having such a structure, the difference of the thickness between the concave groove which retreats from the expanded portion of the cassette and the thick portion along the concave groove can be decreased, so that the generation of the warp or surface sink at this portion can be effectively suppressed.

3) In a cassette storage case having a structure in which a tape cassette is inserted laterally through an insertion port provided on a side surface thereof and stored and having concave grooves which retreat from an expanded portion of the tape cassette formed in a cassette insertion direction of an inner surface of the case, front and rear end portions in the cassette inserting direction along said concave groove are formed thick while the other portions thereof are formed as thickness-missing portions and said thick portions are defined as cassette holding portions.

In the cassette storage case of the present invention having such a structure, it is possible to surely hold the tape cassette in a state in which the tape cassette is stored at a predetermined position as well as to suppress the generation of the above mentioned warp and surface sink.

4) The present invention provides a cassette storage case comprised of a upper half and a lower half and in which a tape cassette is inserted laterally through an insertion port provided on a side surface thereof and stored, characterized in that the cassette storage case is molded integrally such that the upper half and the lower half are linked to each other in a developed state thereof and by bending a link portion between the upper half and the lower half as a hinge at the time of assembly, the upper half and the lower half are joined to each other and that reel stopper pieces elastically deformable so as to engage with tape reels in the tape cassette to block a rotation thereof are formed integrally with an inner surface of the lower half.

In this case, the upper half and the lower half are fixed to each other by engagement.

Further, preferably, polypropylene resin is used as a molding material.

The cassette storage case of the present invention having such a structure can be assembled easily without generating a deviation or a difference of step between the upper half and the lower half at the time of assembly, thereby improving production efficiency and making it possible to reduce production cost.

Further, by using polypropylene resin as molding material of the cassette storage case, its impact resistance and heat resistance can be increased.

DESCRIPTION OF THE PREFERRED EMBODIMENT

Figure 1:
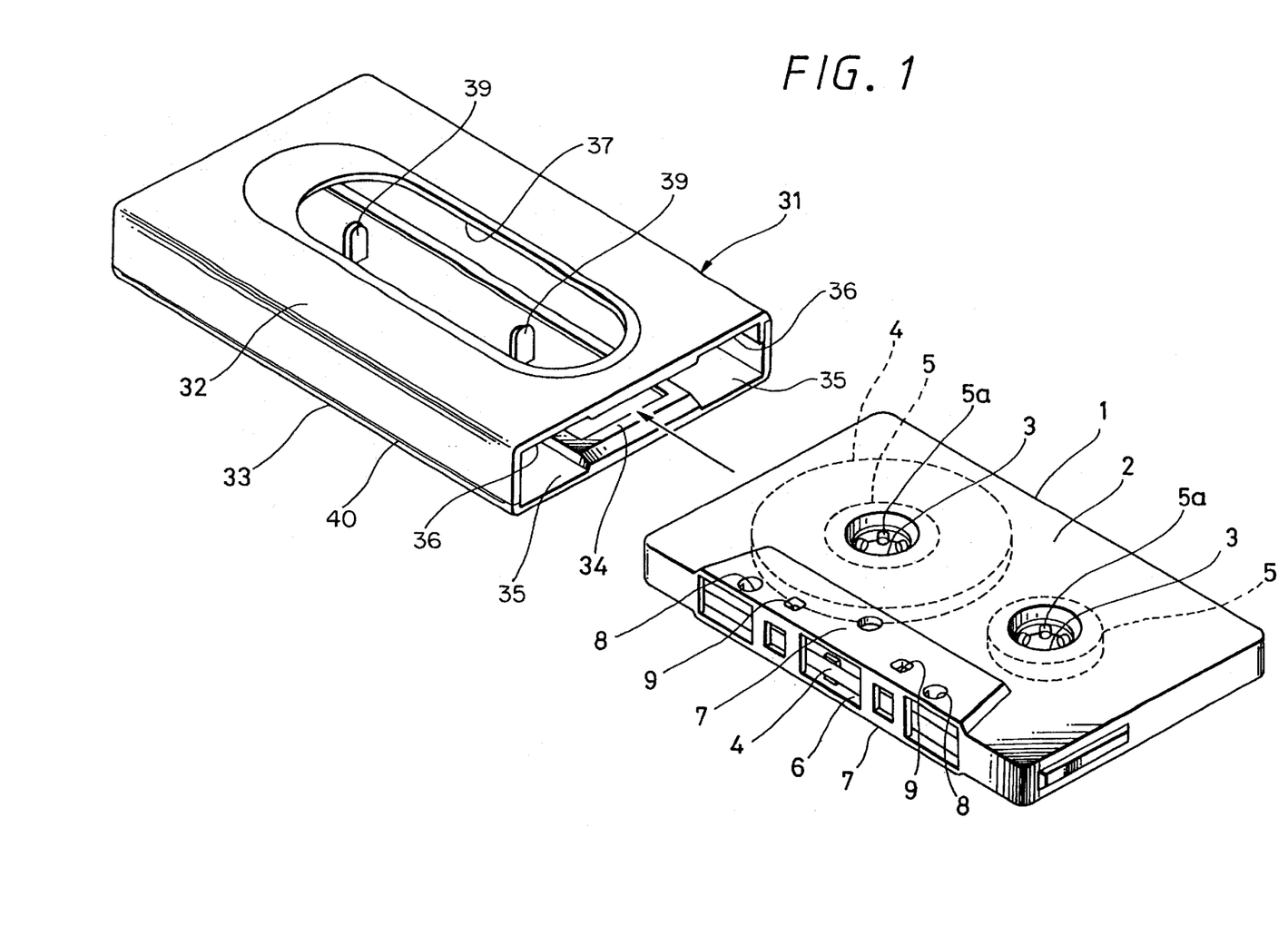
FIG. 1 is a perspective view of a cassette storage case according to an embodiment of the present invention and a cassette.

Referring now to FIG. 1, a cassette storage case 31 according to a first embodiment of the present invention is described. The cassette storage case 31 comprises an upper half (cover half) 32 and a lower half (base half) 33 and is constructed such that a cassette 1 can be inserted by sliding laterally through an insertion port 34 provided on one side surface thereof and stored therein.

Polypropylene resin is preferably used as molding material of the cassette storage case 31. The cassette storage case is integrally molded in a developed state in which the upper half 32 and the lower half 33 are joined together, as shown in FIG. 2.

Figure 2:
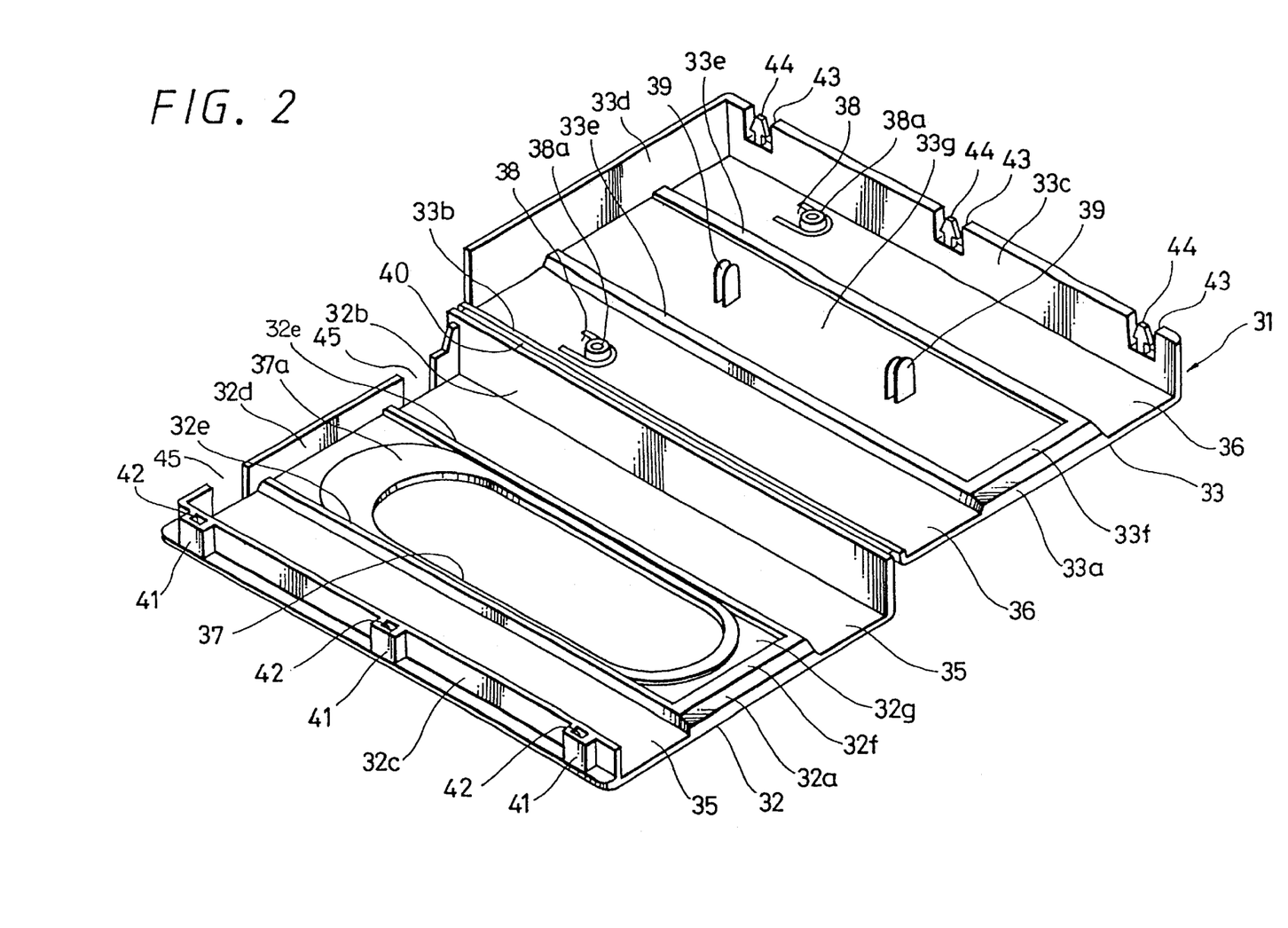
FIG. 2 is a perspective view of the cassette storage case of FIG. 1 before the first and second halves of the cassette storage case are press-fit together.

In FIG. 2, a side wall portion 32b of the upper half 32 and a side edge portion 33b of the lower half 33 are joined together by a thin link portion 40. At the time of assembly, the upper half 32 can be angled with respect to the lower half 33 with the link portion 40 acting as a hinge.

The upper half 32 and the lower half 33 are joined together such that a side wall portion 32c and a deep wall portion 32d of the upper half 32 overlap inner surfaces of a side wall portion 33c and a deep wall portion 33d of the lower half 33. Then, the upper half 32 and the lower half 33 are attached to each other.

That is, in the cassette storage case 31, fitting convex portions 41 are provided at multiple positions on an outer surface of the side wall portion 32c of the upper half 32 and an engaging hole 42 is formed in each of them. On the lower half 33, corresponding notched fitting concave portions 43 are formed in the side wall portion 33c and include an engaging protrusion 44 is provided formed in a tapered hook shape having a tip with a width.

When the upper half 32 and the lower half 33 are joined together, the fitting convex portion 41 and the fitting concave portion 43 engage each other such that the upper half 32 and the lower half 33 are accurately positioned. At the same time, the engaging protrusion 44 is pressed into the engaging hole 42 so that they engage with each other. As a result, the upper half 32 and the lower half 33 are joined and held together in that state.

Figure 3:
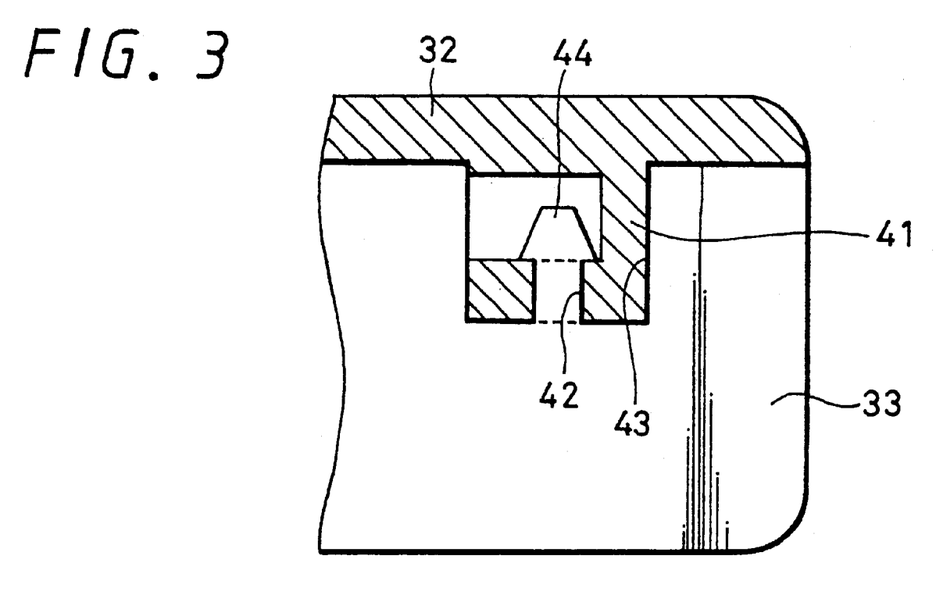
FIG. 3 is a partial cross-sectional view illustrating the upper and lower halves of the cassette storage case after being press-fit together.

FIG. 3 illustrates the upper half 32 and the lower half 31 of the cassette storage case 11 joined together. As shown in FIG. 3, the fitting convex portion 41 is fit in the fitting concave 43, while the engaging protrusion 43 engages with the engaging hole 42 by being press-fit thereinto. Consequently, there is provided a structure in which the upper half 32 and the lower half 33 are accurately and positively joined together.

Referring back to FIG. 2, the upper half 32 and the lower half 33 each have an open surface 32a, 33a without a side wall. When the upper half 32 and the lower half 33 are joined together, the open surfaces 32a, 33a are joined together so as to form the insertion port 34. The cassette 1 can be inserted into the cassette storage case 31 by laterally sliding the cassette 1 through the insertion port 34.

The cassette storage case 31 is constructed so as to accommodate the cassette 1 disposed therein almost without any clearance. Thus, inside the cassette storage case 31, concave grooves 35, 36 for accommodating the expanded portions 7 of the cassette 1 are formed in the cassette insertion direction on the inner surface side of each of the upper half 32 and the lower half 33.

The concave grooves 35, 36 are provided symmetrically on both sides in the cassette insertion direction, so that the cassette 1 can be inserted into the cassette storage case irrespective of the expanded portion 7 being positioned on the left side or on the right side.

As shown in FIG. 2, a central portion (portion between the concave grooves 35) on the inner surface side of the upper half 32 includes a thin portion 32g having a thickness less than a thickness of thick portions 32e, 32f adjacent the concave grooves 35 and the open surface 32a. Likewise, the central portion (portion between the concave grooves 36) on the inner surface side of the lower half 33 includes a thin portion 33g having a thickness less than a thickness of thick portions 33e, 33f adjacent the concave portions 36 and the open surface 33a. As a result, a structure that reduces the amount of molding material needed to form the cassette storage case 11 is achieved.

Further, an opening portion 37 of an oblong shape in the cassette insertion direction is formed in the central portion of the upper half 32 of the cassette storage case 31. Thus, a finger (for example, a thumb) can be inserted through the opening portion 37 to push the cassette 1 out of the cassette storage case 31.

A rib 37a is formed around the opening portion 37 in the thin portion 32g on the inner surface side of the upper half 32 so as to improve the strength of the upper half 32, thereby preventing distortion.

Inside the cassette storage case 31, stopper tabs 38 are provided on the inner surface side of the lower half 33 to prevent the cassette 1 from unexpectedly jumping out of the cassette storage case 31 when in a stored state. The stopper tabs 38 are positioned within the concave groove 36 and each stopper tab 38 is formed with a U-shape notched groove and an engaging protrusion 38a provided at a front end thereof.

Then, when the cassette 1 is partially inserted into the cassette storage case 31, the stopper tabs 38 are elastically deformed and are pressed down by the expanded portions 7 of the cassette 1. When the cassette 1 is completely inserted into the cassette storage case 31, the engaging protrusions 38a are aligned with the capstan shaft insertion hole 8 in the expanded portion 7 and are elastically restored to their original state. As a result, the engaging protrusions 38a are received within the capstan shaft insertion hole 8 to hold the cassette 1 in a light locked state within the cassette storage case 31, thereby preventing the cassette 1 from unexpectedly jumping out (slipping out) of the cassette storage case 31.

The cassette storage case 31 of the invention has, as mentioned above, such a structure that the cassette 1 can be inserted thereinto irrespective of whichever direction the cassette faces, so the stopper tabs 38 are provided symmetrically on both the right and left sides of the cassette insertion direction.

Further, reel stopper pieces 39 are provided inside the cassette storage case 31 to prevent an unnecessary rotation of the tape reels 5 in the cassette 1, thereby preventing the magnetic tape 4 from becoming loose. The reel stopper pieces 39 are formed integrally on the thin portion 33g so as to protrude upwardly on the inner surface side of the lower half 33 in a location corresponding to the reel driving shaft insertion holes 3 of the cassette 1. In this embodiment of the invention, two reel stopper pieces 39 are provided in parallel in the cassette insertion direction.

When the cassette 1 is partially inserted into the cassette storage case 31, the reel stoppers 39 are subjected to elastic deformation and are pressed down by the cassette 1. When the cassette 1 is completely inserted into the cassette storage case 31, the reel driving shaft insertion holes 3 of the cassette 1 are aligned with the reel stopper pieces 39. As a result, the reel stopper pieces 39 are elastically restored to their original state and received within the engaging protrusions 5a on an inner circumference of the tape reel 5, thereby preventing rotation of the tape reels 5. It will be appreciated that both reel stopper pieces 39 engage with the tape reels 5 at the same time to positively prevent the rotation of the tape reels 5.

In this embodiment of the cassette storage case 31, concave notches 45 are formed on the deep wall portion 32d of the upper half 32 that accommodates the protrusion 10 on the side surface portion 2a of the cassette 1 when the cassette 1 is stored in the cassette storage case 31. Because the cassette 1 can be inserted into the cassette storage case 31 in any direction as described above, the notches 45 are formed symmetrically on both the right and left sides of the cassette insertion direction.

Figure 4:
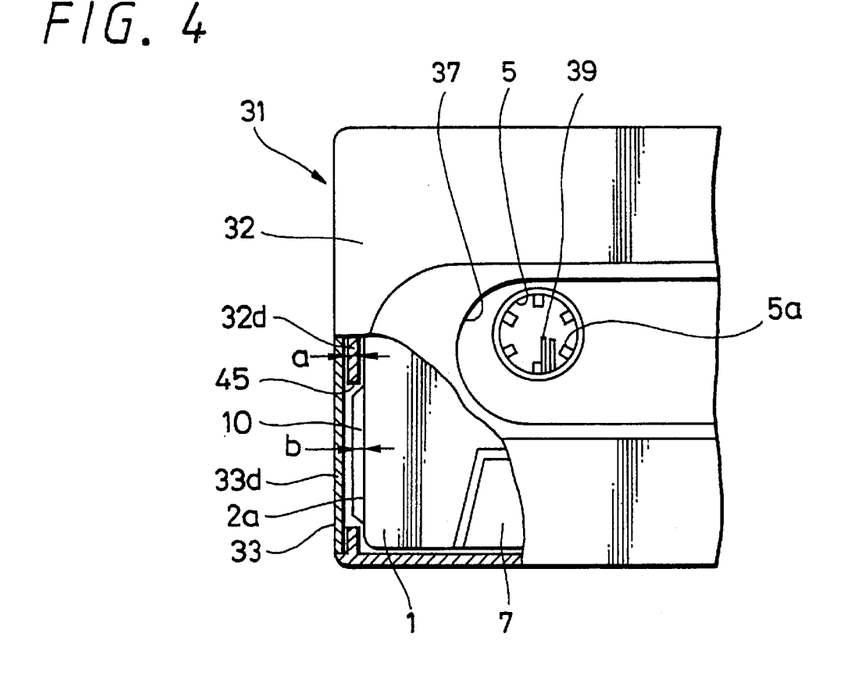
FIG. 4 is a partially cutaway plan view of the cassette storage case when the cassette is in a lightly locked stored state.
Figure 5:
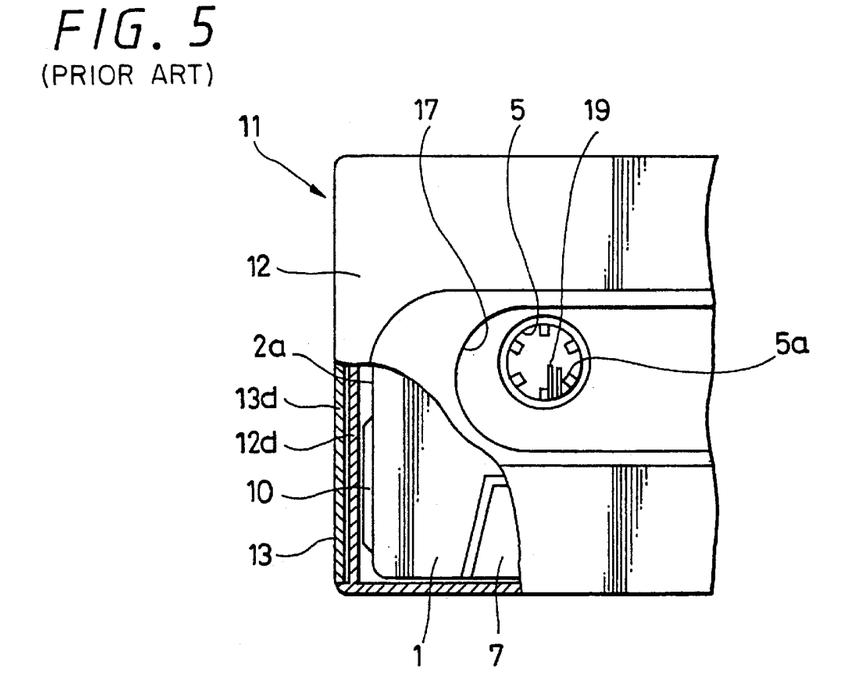
FIG. 5 is a partially cutaway plan view of a conventional cassette storage case when the cassette is stored within the case.

Further, as shown in FIG. 4, the thickness "a" of the deep wall portion 32d in which the notch 45 is to be formed is preferred to be the same as or larger than a protruding length "b" of the protrusion 10 of the cassette 1. As a result, the protrusion 10 of the cassette 1 is accommodated in the notch 45 in the deep wall portion 32d. Therefore, a large gap does not exist between the side surface portion 2a of the cassette 1 and the deep wall portion 32d, as compared to the conventional cassette storage case 11 shown in FIG. 5. In other words, the cassette 1 can be stored in cassette storage case 31 in the lightly locked state without any gap between the side surface portion 2a of the cassette 1 and the deep wall portion 32d, as shown in FIG. 4.

In this embodiment of the invention, the length of the cassette storage case 31 in the cassette insertion direction can be reduced by a length corresponding to the protruding length "b" of the protrusion 10 because the protrusion 10 of the cassette 1 is accommodated in the notch 45 of the deep wall portion 32d. Thus, the size of the cassette storage case 31 can be reduced and an amount of molding material is pared down, thereby leading to reduction of production cost as compared to the conventional cassette storage cases.

Figure 6:
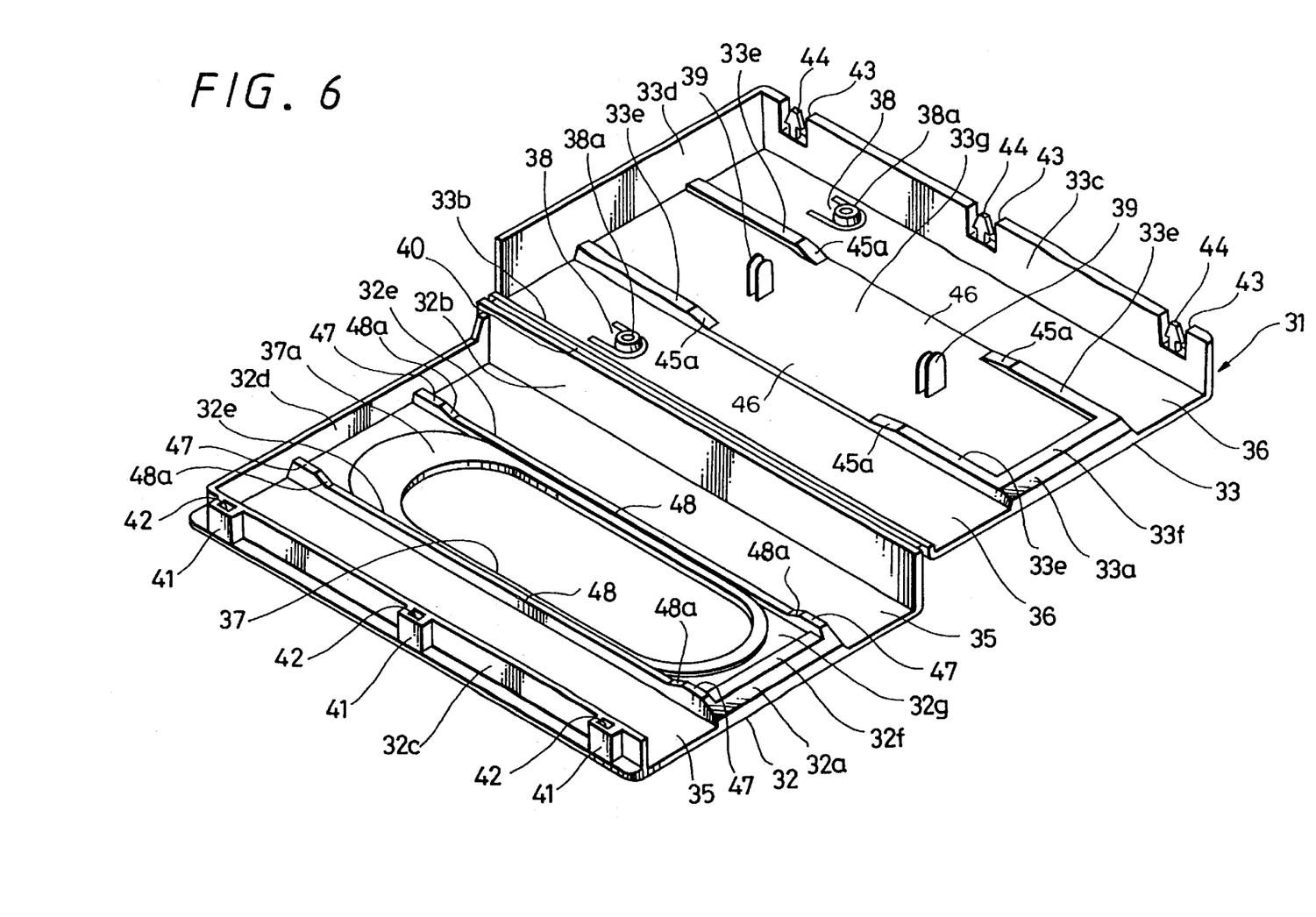
FIG. 6 is a perspective view of a cassette storage case according to a second embodiment of the present invention.

Referring now to FIGS. 6 and 7, a second embodiment of the present invention will be described. In FIG. 6, reference numeral 31 denotes a cassette storage case comprising a pair of cassette halves, namely, an upper half (cover half) 32 and a lower half (base half) 33. Then, a cassette 1 can be inserted laterally through an insertion port 34 provided on one side surface thereof and stored therein.

Polypropylene resin is preferably used as molding material for the cassette storage case 31. The cassette storage case 31 is integrally molded such that the upper half 32 and the lower half 33 are joined together by a thin link portion 40, as shown in FIG. 6.

One aspect of the second embodiment of the present invention is that the cassette storage case 31 includes a thickness-missing portion 46 provided in a central portion (portion between the concave grooves 35) on the inner surface side of the upper half 32.

One difference between the first embodiment of the invention in which the thick portion 33e is formed over the entire length of the cassette. in the cassette insertion direction along the concave groove 36 is that the thickness of the thickness-missing portion 46 is the same as that of the thin portion 33g. In, other words, the thickness of the thick portion 33e is eliminated so that the thickness of the thickness-missing portion 46 is in the same plane as the thin portion 33g.

In the cassette storage case 31 of this embodiment, a difference of thickness between the concave groove 36 of the lower half 33 and the thick portion 33e along the concave groove 36 can be reduced so that a small change of the thickness between the concave groove 36 and the thick portion 33e can be achieved. Thus, the formation of warp or surface sink at the thickness-missing portion 46 due to the manufacturing process is effectively prevented.

Further, the cassette storage case 31 includes gently-sloped end portions 45a (a portion between the thickness-missing portion 46 and the thick portion 33e) formed on the ends of each of the thickness-missing portions 45. As a result, when the cassette 1 is taken in or out of the cassette storage case 31, the cassette 1 is not caught on the end portions 45a of the thickness-missing portion 46, particularly if a label is pasted on the cassette 1. Thus, the cassette 1 can be taken in or out of the cassette storage case 31 in a smooth fashion.

Another aspect of this embodiment of the invention is that cassette holding portions 47 are provided on the upper half 32 so as to hold the cassette 1 almost without any clearance. The cassette holding portions 47 are formed so as to be higher in elevation at front and rear end portions of the cassette insertion direction of the thick portion 32e along each of the concave grooves 35. That is, each cassette holding portions 47 at both ends of the thick portion 32 are formed thicker than a central portion therebetween.

As shown in FIG. 4, a height "a" of each cassette holding portion 47 is formed substantially the same as a gap "b" between the cassette 1 and the upper half 32 when the cassette 1 is stored in the lightly locked state. Thus, the cassette 1 is stored and held by the cassette holding portion 47 such that there is substantially no clearance between the cassette 1 and the cassette storage case 31.

In the cassette storage case 31 of this embodiment, deformation, such as a crush or a distortion, is not generated in the cassette storage case 31, even if pressure or the like is applied from outside. Although heat and pressure are applied to the cassette storage case 31 when wrapping the case with a wrapping film during a wrapping process, for example, a deformation or distortion is not generated in the cassette storage case 31 of the second embodiment and thus, wrinkles in the wrapping film are prevented.

Further, because the cassette 1 is not loosely held in the cassette storage case 31, an unnecessary rotation of the tape reel 5 can be prevented.

Particularly in this example of the cassette storage case 31 having the reel stopper tabs 39, it is preferable to provide a cassette half (lower half 33 in this example) containing the reel stopper pieces 39 and an opposite side cassette half (upper half 32 in this example) with the thickness-missing portion 48.

When the cassette 1 is inserted (or taken out), as described above, the reel stopper pieces 39 of the lower half 33 are deformed such that they are pressed down. Because the thickness-missing portions 48 are provided on the upper half 32 that is an opposite side of the reel stopper pieces 39, the cassette 1 is capable of moving toward the upper half 32 in the case, except near the insertion port 34. Therefore, the reel stopper pieces 39 are deformed without any limitation and are then restored to engage with the tape reel 5. When the cassette 1 is completely inserted into the cassette storage case 31, the cassette 1 is held such that it rides on the cassette holding portions 47. As a result, the cassette 1 can be taken in and out easily without becoming loose.

In this embodiment of the invention, it is desirable to form the thickness-missing portions 48 with a wide length to make the cassette move easily toward the upper half 32 when inserted into the cassette storage case 31, as shown in FIG. 6. As described above, the cassette storage case 31 is integrally molded such that the upper half 32 and the lower half 33 are linked to each other by the link portion. By bending the link portion 40, the upper half 32 and lower half 33 are press-fit together to assembly the cassette storage case 31. As a result, the cassette storage case 31 can be assembled easily without generating any deviations or differences of step between the upper half 32 and the lower half 33.

Further, a process for installing the reel stopper pieces 39 is not necessary because the reel stopper pieces 39 are integrally formed with the cassette storage case 31, unlike conventional cassette storage cases. Thus, the assembly of the cassette storage case 31 of the invention is easier than conventional cassette storage cases.

In addition, the cassette storage case 31 is molded of polypropylene material. Because polypropylene material has excellent impact resistance and heat resistance properties, it is possible to provide a high quality cassette storage case.

Further, because polypropylene material is lighter than polystyrene resin that is conventionally used, it contributes to reduction of the weight of the cassette storage case 31.

Although examples of the embodiments of the present invention have been described, the present invention is not limited to these examples.

In the cassette storage case 31 described above, although the upper half and the lower half are integrally molded, the present invention may be applied to such a cassette storage case in which the upper half and the lower half are molded separately and assembled by ultrasonic wave fusion, or the like.

According to one embodiment of the present invention described above, the slide-type cassette storage case includes a notch in the deep wall portion that accommodates a protrusion on a side surface portion of the cassette. As a result, any looseness of the cassette when inserted into the cassette storage case is eliminated and the cassette can be stored in a stabilized state. Therefore, the size of the case can be reduced and thus, the production cost can be also reduced.

According to another embodiment of the present invention described above, the slide-type cassette storage case includes thickness-missing portions located substantially in the center of the thick portion along the concave groove that accommodates the expanded portion of the cassette. As a result, the difference of the thickness between the concave groove and the thick portion can be reduced. Therefore, a generation of the warp or surface sink at this portion after molding of the case is effectively suppressed so that a high quality cassette storage case can be provided.

Because the cassette storage case can be assembled easily without generating a deviation or difference of step between the upper half and the lower half, production efficiency is improved, thereby leading to reduction of production cost. At the same time, because polypropylene resin is used as the molding material of the cassette storage case, impact resistance and heat resistance can be improved, while reducing the reduction of the cassette storage case.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A cassette storage case, comprising:

an upper half;

a lower half hingedly attached to said upper half by a link portion for joining said upper half to said lower half to form an insertion port provided on one side surface in which a tape cassette having a protrusion is inserted laterally through said insertion port;

a deep wall portion opposite said insertion port; and a notch formed in said deep wall portion for accommodating the protrusion on the tape cassette.

2. The cassette storage case according to claim 1, wherein a thickness of the deep wall portion in which the notch is formed is larger than a protruding length of the protrusion of the tape cassette.

* * * * *